United States Patent
Lin et al.

(10) Patent No.: US 11,157,259 B1
(45) Date of Patent: Oct. 26, 2021

(54) SEMANTIC AND STANDARD USER INTERFACE (UI) INTEROPERABILITY IN DYNAMICALLY GENERATED CROSS-PLATFORM APPLICATIONS

(71) Applicant: INTUIT INC., Mountain View, CA (US)

(72) Inventors: Steve Lin, Mountain View, CA (US); Anshu Verma, Mountain View, CA (US); Jay Yu, San Diego, CA (US); Kerry K. Kartchner, Mountain View, CA (US); Tapasvi Moturu, Mountain View, CA (US); Muzaffar H. Malik, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 45 days.

(21) Appl. No.: 15/852,946

(22) Filed: Dec. 22, 2017

(51) Int. Cl.
  *G06F 8/65* (2018.01)
  *G06F 9/451* (2018.01)
  *G06F 9/54* (2006.01)

(52) U.S. Cl.
  CPC ............... *G06F 8/65* (2013.01); *G06F 9/451* (2018.02); *G06F 9/542* (2013.01)

(58) Field of Classification Search
  CPC ....... G06F 9/54–548; G06F 8/65; G06F 9/451
  See application file for complete search history.

(56) References Cited

U.S. PATENT DOCUMENTS

| | | |
|---|---|---|
| 6,300,947 B1 | 10/2001 | Kanevsky |
| 6,640,249 B1 | 10/2003 | Bowman-Amuah |
| 6,721,713 B1 | 4/2004 | Guheen et al. |
| 6,871,348 B1 | 3/2005 | Cooper |

(Continued)

FOREIGN PATENT DOCUMENTS

WO  2015122691 A1  8/2015

OTHER PUBLICATIONS

López, Javier, et al. "A component-based approach for engineering enterprise mashups." International Conference on Web Engineering. Springer, Berlin, Heidelberg, 2009. (Year: 2009).*

(Continued)

*Primary Examiner* — Doon Y Chow
*Assistant Examiner* — Joanne G Macasiano
(74) *Attorney, Agent, or Firm* — Patterson + Sheridan, LLP

(57) ABSTRACT

Certain aspects of the present disclosure provide techniques for facilitating communication between widgets of cross-platform applications. An exemplary system is configured to instantiate a cross-platform application comprising a plurality of application widgets. The system is further configured to determine that a first application widget of the plurality of application widgets executes instructions through an execution container of the cross-platform application. The system is further configured to receive a request comprising criteria from the first application widget, wherein the criteria specify an application widget to listen for communications from. The system is further configured to receive a communication (Continued)

from the second application widget and determines that the communication matches the criteria of the request by the first application widget. The system is further configured to transmit to the first application widget an update containing data from the communication.

20 Claims, 8 Drawing Sheets

(56) References Cited

U.S. PATENT DOCUMENTS

| | | | |
|---|---|---|---|
| 7,346,920 B2 | 3/2008 | Lamkin et al. | |
| 7,418,435 B1 | 8/2008 | Sedlar | |
| 7,526,719 B1 | 4/2009 | Gopalakrishnan | |
| 7,707,507 B1 | 4/2010 | Rowe et al. | |
| 7,895,522 B2 | 2/2011 | Wong et al. | |
| 7,996,780 B1 | 8/2011 | Mitnick | |
| 8,244,277 B1 | 8/2012 | Cha et al. | |
| 8,429,103 B1 | 4/2013 | Aradhye et al. | |
| 8,826,145 B1 | 9/2014 | Kirkpatrick et al. | |
| 8,856,670 B1 | 10/2014 | Thakur et al. | |
| 9,405,427 B2 | 8/2016 | Curtis et al. | |
| 9,588,661 B1 | 3/2017 | Jauhal et al. | |
| 9,846,682 B1* | 12/2017 | Righetto | G06F 17/212 |
| 10,096,022 B2 | 10/2018 | Gupta | |
| 10,162,624 B1 | 12/2018 | Moturu et al. | |
| 2002/0010716 A1 | 1/2002 | McCartney et al. | |
| 2002/0059278 A1 | 5/2002 | Bailey et al. | |
| 2003/0058277 A1 | 3/2003 | Bowman-Amuah | |
| 2003/0126311 A1* | 7/2003 | Kushnirskiy | G06F 9/44526 |
| | | | 719/328 |
| 2003/0145338 A1 | 7/2003 | Harrington | |
| 2004/0216042 A1* | 10/2004 | Consolatti | G06F 8/30 |
| | | | 715/234 |
| 2004/0216058 A1 | 10/2004 | Chavers et al. | |
| 2004/0218224 A1 | 11/2004 | Cariffe | |
| 2005/0149985 A1 | 7/2005 | Okamoto | |
| 2005/0187945 A1 | 8/2005 | Ehrich et al. | |
| 2006/0074735 A1 | 4/2006 | Shukla et al. | |
| 2006/0206890 A1 | 9/2006 | Shenfield et al. | |
| 2006/0236254 A1 | 10/2006 | Mateescu et al. | |
| 2007/0204125 A1 | 8/2007 | Hardy | |
| 2008/0127091 A1 | 5/2008 | Ericsson et al. | |
| 2008/0216049 A1* | 9/2008 | Fournies | G06F 9/54 |
| | | | 717/100 |
| 2009/0063988 A1 | 3/2009 | Graeff et al. | |
| 2009/0070162 A1 | 3/2009 | Leonelli et al. | |
| 2009/0070409 A1* | 3/2009 | Clayton | G06F 9/542 |
| | | | 709/203 |
| 2009/0235149 A1 | 9/2009 | Frohwein | |
| 2009/0249282 A1 | 10/2009 | Meijer et al. | |
| 2009/0249359 A1* | 10/2009 | Caunter | H04L 67/18 |
| | | | 719/315 |
| 2010/0138778 A1* | 6/2010 | Dewan | G06F 9/451 |
| | | | 715/789 |
| 2010/0153865 A1* | 6/2010 | Barnes | G06F 3/0484 |
| | | | 715/762 |
| 2010/0228963 A1 | 9/2010 | Kassab et al. | |
| 2010/0262953 A1 | 10/2010 | Barboni et al. | |
| 2010/0274869 A1 | 10/2010 | Warila et al. | |
| 2011/0106876 A1 | 5/2011 | Delaney et al. | |
| 2011/0191751 A1 | 8/2011 | Munday et al. | |
| 2011/0312387 A1 | 12/2011 | Heo et al. | |
| 2012/0110480 A1* | 5/2012 | Kravets | G06F 16/9577 |
| | | | 715/760 |
| 2012/0198457 A1 | 8/2012 | Leonelli et al. | |
| 2013/0054812 A1 | 2/2013 | DeCoteau | |
| 2013/0065691 A1* | 3/2013 | Gavish | G06F 9/542 |
| | | | 463/40 |
| 2013/0091416 A1* | 4/2013 | Villoslada De La Torre | |
| | | | G06F 40/14 |
| | | | 715/234 |
| 2013/0111328 A1 | 5/2013 | Khanna et al. | |
| 2013/0111373 A1 | 5/2013 | Kawanishi et al. | |
| 2013/0151417 A1 | 6/2013 | Gupta | |
| 2013/0305218 A1 | 11/2013 | Hirsch et al. | |
| 2014/0089185 A1 | 3/2014 | Desai et al. | |
| 2014/0089824 A1 | 3/2014 | George et al. | |
| 2014/0208309 A1 | 7/2014 | Wu et al. | |
| 2014/0237486 A1* | 8/2014 | Zhang | G06F 9/544 |
| | | | 719/315 |
| 2014/0280214 A1 | 9/2014 | Han et al. | |
| 2014/0282014 A1 | 9/2014 | Lee et al. | |
| 2015/0089349 A1 | 3/2015 | Duplessis et al. | |
| 2015/0095882 A1 | 4/2015 | Jaeger et al. | |
| 2015/0113504 A1 | 4/2015 | Artzi et al. | |
| 2015/0378502 A1 | 12/2015 | Hu et al. | |
| 2016/0004565 A1 | 1/2016 | Harper et al. | |
| 2016/0104205 A1* | 4/2016 | Greenberg | G06Q 30/0272 |
| | | | 705/14.68 |
| 2016/0269509 A1 | 9/2016 | Dooley | |
| 2017/0078452 A1 | 3/2017 | Verrijt et al. | |
| 2017/0255455 A1 | 9/2017 | Collier et al. | |
| 2017/0344921 A1 | 11/2017 | Leonelli et al. | |
| 2018/0032318 A1 | 2/2018 | Satagopan et al. | |
| 2018/0075115 A1 | 3/2018 | Murray et al. | |
| 2018/0157499 A1 | 6/2018 | Lee et al. | |
| 2018/0322136 A1* | 11/2018 | Carpentier | G06F 16/168 |
| 2018/0364879 A1 | 12/2018 | Adam et al. | |
| 2019/0114061 A1 | 4/2019 | Daniels et al. | |

OTHER PUBLICATIONS

Wilson, Scott, et al. "Orchestrated user interface mashups using w3c widgets." International Conference on Web Engineering. Springer, Berlin, Heidelberg, 2011. (Year: 2011).*

Isaksson, Erik, and Matthias Palmér. "Usability and inter-widget communication in PLEs." Fifth European Conference on Technology Enhanced Learning (EC-TEL10), The 3rd Workshop on Mash-Up Personal Learning Environments (MUPPLE10). 2010. (Year: 2010).*

Title: WEBDIFF: Automated identification of cross-browser issues in web applications, author: SR Choudhary et al, source: IEEE, published on 2010.

Title: Cross-platform development tools for smartphone applications, author: J Ohrt et al, published on 2012.

Title: A comparative analysis of cross-platform development approaches for mobile applications, author: Xanthopoulos et al, published on 2013.

* cited by examiner

SEMANTIC AND STANDARD USER INTERFACE (UI) INTEROPERABILITY IN DYNAMICALLY GENERATED CROSS-PLATFORM APPLICATIONS

BACKGROUND

Field

Aspects of the present disclosure generally relate to techniques for deploying software applications, and more specifically to deploying software applications across different platforms with different user interface design philosophies.

Description of the Related Art

Software applications can be consumed on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths which include code for generating a user interface and application logic tightly bound to the application logic. In some cases, applications targeting a common platform do not work on every device implementing the common platform, resulting in developers having to write application logic that accommodates different devices on the common platform.

As the number of applications targeting different platforms and applications supporting variations on a common workflow increases, the difficulty in providing a different version of the same application for each device increases. For example, a set of tax preparation applications perform the same general task of preparing a user's taxes, but a variety of discrete software artifacts may exist for variations on the workflow (e.g., one artifact may execute a workflow for preparing a simple tax return for a taxpayer in the United States, another artifact may execute a workflow for preparing a complex tax return for a taxpayer in the United States, another artifact may execute a workflow for preparing a simple tax return in Canada, and the like). While these applications may perform the same general task (e.g., of tax preparation) and may share a significant amount of code, each application may also implement custom code dedicated to performing a task according to each device.

Because these applications may implement a combination of custom and shared application logic that is bound to the user interface of the application, building and maintaining these applications generally requires large amounts of developer time. For example, if a common code component is modified, development teams may need to verify that the modification to the common code component does not adversely affect the operation of applications that use the common code component (e.g., render custom code components in a specific application unusable or otherwise modify the functionality of the custom code components). Further, as new variants of a workflow are identified, additional applications may be built, which adds to the universe of applications to be maintained.

Therefore, there is a need for systems that reduce the amount of time needed to develop, update, and deploy applications across different computing platforms.

SUMMARY

One embodiment of the present disclosure provides a system for facilitating communication between widgets of cross-platform applications. The system includes a memory and a processor configured to execute an application shell. The system is configured to cause the application shell to do the following: The application shell instantiates a cross-platform application comprising a plurality of application widgets, wherein an application widget is a reusable segment of the cross-platform application which may be executed on multiple platforms. The application shell then determines that a first application widget of the plurality of application widgets executes instructions through an execution container of the cross-platform application. The application shell then receives a request comprising criteria from the first application widget, wherein the criteria specify an application widget to listen for communications from. The application shell then receives a communication from the second application widget and determines that the communication matches the criteria of the request by the first application widget. Finally, the application shell transmits to the first application widget an update containing data from the communication.

Another embodiment includes a method for facilitating communication between widgets of cross-platform applications. The method generally includes an application shell instantiating a cross-platform application comprising a plurality of application widgets, wherein an application widget is a reusable segment of the cross-platform application which may be executed on multiple platforms. The application shell then determines that a first application widget of the plurality of application widgets executes instructions through an execution container of the cross-platform application and that a second application widget of the plurality of application widgets executes instructions directly on the processor. The application shell then receives a request comprising criteria from the first application widget, wherein the criteria specify an application widget to listen for communications from. The application shell then receives a communication from the second application widget and determines that the communication matches the criteria of the request by the first application widget. Finally, the application shell transmits to the first application widget an update containing data from the communication.

Still another embodiment of the present invention includes a non-transitory computer readable medium comprising instructions to be executed in a computer system, wherein the instructions when executed in the computer system perform a method for facilitating communication between widgets of cross-platform applications. The operation generally includes an application shell instantiating a cross-platform application comprising a plurality of application widgets, wherein an application widget is a reusable segment of the cross-platform application which may be executed on multiple platforms. The application shell then determines that a first application widget of the plurality of application widgets executes instructions through an execution container of the cross-platform application. The application shell then receives a request comprising criteria from the first application widget, wherein the criteria specify an application widget to listen for communications from. The application shell then receives a communication from the second application widget and determines that the communication matches the criteria of the request by the first application widget. Finally, the application shell transmits to the first application widget an update containing data from the communication.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
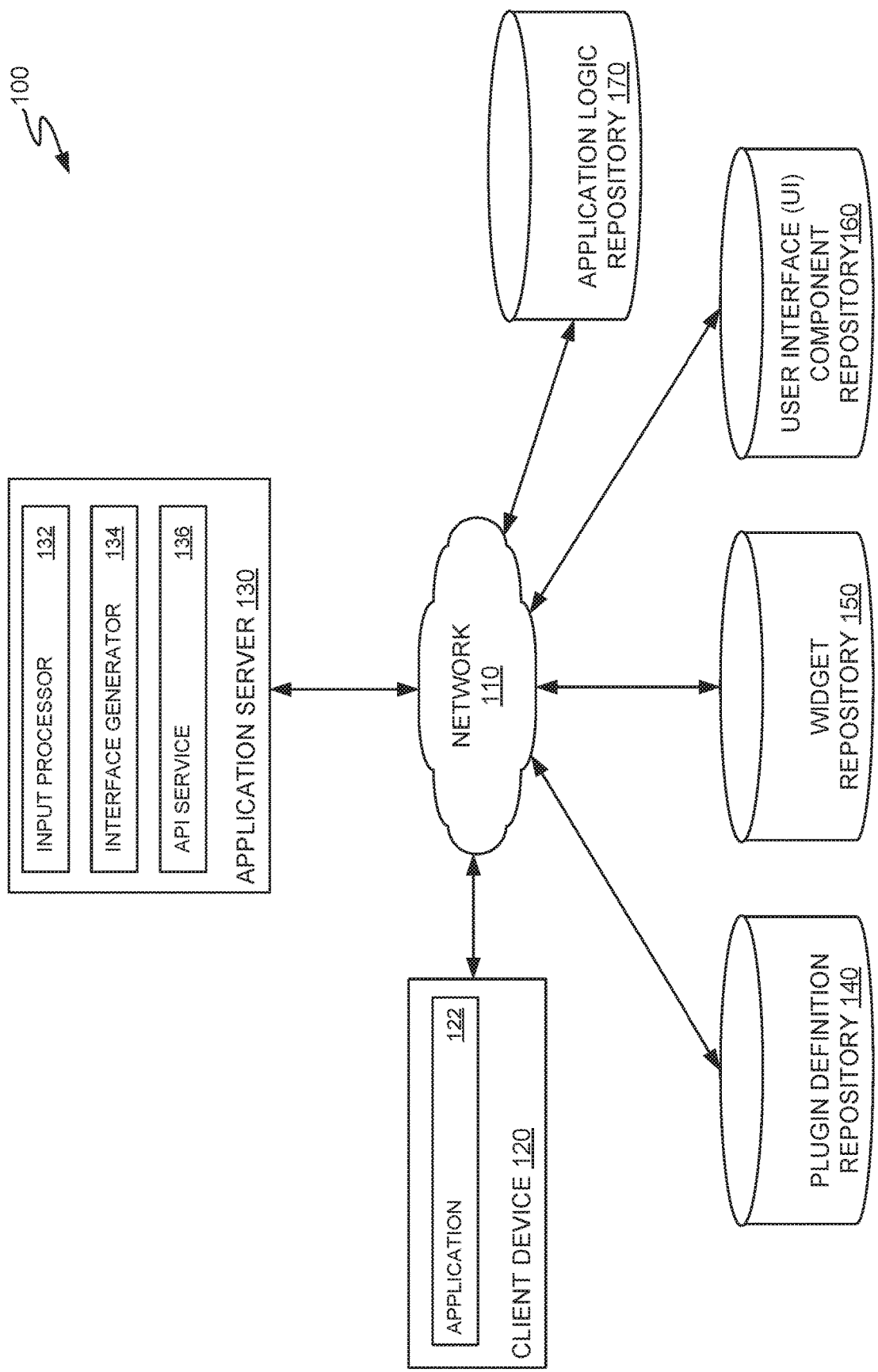
FIG. 1 illustrates an exemplary computing system in which user interfaces are dynamically generated and deployed to client devices executing a cross-platform application, according to one embodiment.

Traditionally, applications were designed for specific platforms. For example, a platform may refer to a device type, such as a mobile device, or a device model, such as a particular smartphone model, or an operating system running on a variety of device models, such as iOS, or an attribute of a device, such as a wide format touchscreen device, and the like. In some cases, target platforms for a software application are based on multiple attributes, such as a particular device model running a particular operating system, or having a particular set of features (e.g., a particular user interface technology). Critically, traditional application development usually required designing individual code bases for each and every permutation of a platform. Because the number of platform permutations continues to grow, the current model of software development is unsustainable.

A family of related applications can be designed to execute on several different platforms using a standard base of code, in order to reduce the upkeep costs of maintaining applications for each platform as compared to maintaining standalone applications for each available platform. To simplify the process of using common code, aspects of the applications, like user interface elements or functional processes, may be broken down into reusable building blocks known as widgets. Widgets may both represent functional processes and display user interface elements used to expose those processes to users of the application. That is, a widget can perform a specific task for an application, and also provide a visual representation of that task through a graphical user interface presented to a user. Widgets may be platform- and even application-agnostic and thus reusable in different, unrelated applications. For example, a widget representing a progress bar may be usable in a variety of applications, and may be designed to be usable with multiple platforms.

However, not all tasks performed by an application are best created or represented using the same kinds of widgets. Specifically, widgets may be created with different kinds of user interface strategies. Two possible strategies may result in semantic user interfaces and standard user interfaces.

Standard, or native, user interfaces are designed for a particular platform and can therefore be visually tailored to that platform. Standard user interfaces may not be easily ported from one platform to another as a result of being tailored to a particular platform.

Semantic user interfaces, by contrast, are made to be commonly executed on many platforms. Semantic user interfaces may utilize an on-device interpreter layer to implement the interface on different platforms. For example, an application making use of a semantic user interface may call for a choice from the user. One platform's interpreter may implement a drop-down menu for the user to make a choice, while a different platform's interpreter may implement a series of radio buttons for that same choice. As a result, an application making use of a semantic user interface may have no defined visual appearance until the on-device interpreter layer makes a relevant decision at runtime.

Semantic user interfaces may execute in a standardized execution container to allow for consistent execution across all platforms. Such an execution container may have computing resources set aside for it, which it can use to independently execute instructions. An execution container acts as a bridge for a particular platform and platform-agnostic code. The execution container may itself be configured to execute on a particular platform, but is capable of executing platform-agnostic code, which allows platform-agnostic code to execute on the particular platform. By handing off direct responsibility of execution to an execution container, functionality may be kept consistent for all platforms making use of such an execution container.

Widgets utilizing standard user interface elements may be referred to as standard widgets, and widgets utilizing semantic user interface elements may be referred to as semantic widgets. Standard widgets may be created using computer instructions that run directly on a particular platform. Semantic widgets may be created and executed within a standardized execution container such that they may operate across many platforms. That is, semantic widgets may operate within an abstracted layer of an application.

Some application tasks will best be represented with a semantic user interface, and some will be best represented with a standard user interface. Because widgets each represent a task or function of an application rather than a complete application themselves, such a complete application may comprise many widgets, including both semantic and standard widgets. The application may function better if semantic widgets and standard widgets can communicate effectively. Semantic and standard widgets, however, will likely be incompatible and possibly incapable of direct communication because the two types of widgets may operate in different layers of the application. For example, a standard widget may execute instructions directly on platform hardware, while a semantic widget may execute instructions in an execution container which passes instructions to the platform hardware. Therefore, systems and methods are needed to enable semantic widgets and standard widgets to communicate effectively with one another.

Disclosed herein are systems and methods by which different kinds of widgets can communicate within a system for dynamically generating applications for a variety of platforms. To enable this capability, an application shell, or app shell, may be provided. The app shell may provide access to standardized application utilities through a sandbox API; enable widgets to access device-specific capabilities; and/or provide a common interface for all widgets to communicate through. This communication is possible irrespective of the underlying structure of the widget.

FIG. 1 illustrates an exemplary computing system, according to one embodiment. As illustrated, computing system 100 includes a client device 120, an application server 130, a plugin definition repository 140, a widget repository 150, a user interface (UI) component repository 160, and an application logic repository 170, connected via network 110.

Client device 120 may be any sort of computing device, such as a desktop computer, a laptop, a tablet, a smartphone, or the like. Client device 120 may execute an application 122 that communicates with application server 130 to obtain a user interface for the application 122 and provide data to the application server 130 for processing. In one example, application 122 executes a multi-step workflow where each step of the workflow is displayed as a set of interface components that are built dynamically based, at least in part, on the platform (e.g., type of device and operating system) and current state of the application (e.g., a progress state of a workflow).

In some cases, the user interface definition may include standard user interface elements, which may be specific to a platform, as well as semantic user interface elements and web-based user interface elements, which may be shared across different platforms and allow for a common user interface to be generated across multiple platforms as well as standard user interface elements. In one embodiment, the collection of user interface elements may be selected based on a particular platform as well as based on an application state, such as a progress state of a workflow, where a workflow may include one or more steps or tasks. For example, a user interface definition for a step of a tax preparation workflow could include a combination of web-based user interface elements used to manually add form data along with standard user interface components that allow application 122 to capture and process data from an input/output device, such as a camera at client device 120. The web-based and standard interface components may be stored in the user interface component repository 160. In another portion of the tax preparation workflow, where a user is asked to identify deductions the user is entitled to claim, the user interface definition may identify a number of web-based user interface elements from user interface component repository 160 to render in application 122.

In some embodiments, native code components may also be included in a user interface definition to take advantage of functionality exposed by the operating system executing on client device 120. For example, native code components may be referenced in a user interface definition which generates notifications related to application 122. In other examples, native code components can be referenced in a user interface definition to allow users to provide voice data into application 122, engage in video chats with other users or live support representatives using application 122, etc.

As a user interacts with application 122, application 122 may transmit user-provided data and context information to application server 130 for processing. The context information may include device information (e.g., the type of device, the operating environment in which application 122 is being executed on client device 120, capabilities of the client device 120, and the like) and application state information. The application state information may include the current version of a user interface specification (e.g., widget definitions and/or updated rules for processing user-provided data) for a specific step of a workflow cached at client device 120, the current step of the workflow executing in application 122, and a variation of the application a user is executing (e.g., the version of the application specific to a geographical region where client device 120 hosting the application 122 is located). When a user submits data to application server 130, application 122 may invoke a specific function in the user interface definition. In response to transmitting data to application server 130, application 122 generally receives a new user interface definition identifying the present step of the workflow, the user interface elements to be displayed on client device 120, and the function(s) to be invoked upon completion of data entry for the present step of the workflow.

Application server 130 generally receives user input from client device 120 and may generate a user interface definition for the client device to display user interface elements for the next step of a workflow based on the received user input. As illustrated in FIG. 1, application server 130 includes an input processor 132, an interface generator 134 and an API service 136. Although shown as a single unit, the functions of application server 130 may be performed by distributed computing devices, and the individual components may be included on separate computing devices.

Input processor 132 generally receives user-provided data from application 122 (e.g., form input), an indication of the next step to be performed in a workflow executing in application 122, and other context information from client device 120 for processing. Input processor 132 generally invokes one or more functions exposed by API service 136 and identified in the user-provided data. Input processor 132 examines any other data provided by client device 120 to generate a user interface definition for client device 120 including one or more plugins from plugin repository 140.

A plugin generally refers to a collection of widgets. A widget refers to a discrete element of an application that the client device 120 and/or the application server 130 can use to represent and perform a discrete task, and references to one or more functions defined in the API service 136 that are invoked to complete the discrete task. Widgets may be usable in different applications. For example, a "credit card information entry" widget may be usable in both a tax preparation application and an accounting application. As discussed above, there may be multiple varieties of widgets, including standard widgets and semantic widgets. A plugin may generally include a set of related widgets that perform a suite of related tasks that together represent a section of the workflow of an application. For example, a plugin for a tax preparation application may represent a section of the workflow for entry of deductions. Such a plugin may include a plurality of widgets, including navigation widgets, text entry widgets, widgets for calculating refund totals, and others. Each widget may define a collection of user interface elements to render on the client device 120 to complete a workflow step or enable a user to input data into application 122. The plugin may identify included widgets to include in the plugin, functions the plugin can invoke through the API service 136, permissions associated with the plugin, behavior of the plugin, intended interactions with other parts of computing system 100, and the like. Each plugin may be versioned as the widget definitions and/or application logic associated with a plugin is updated.

In some cases, input processor 132 may receive information about the current version of a user interface definition associated with a plugin cached at client device 120. If input processor 132 determines that the current version of the plugin in plugin definition repository 140 matches the version of the plugin cached at client device 120, input processor 132 can indicate to client device 120 to render the user interface associated with the next step in the workflow using the cached version. Because the cached version of the user interface definition at client device 120 is the most current version of the user interface definition, input processor 132 need not invoke interface generator 134 to generate an updated user interface definition for the step of the workflow to be displayed on client device 120.

If, however, input processor 132 determines that the current version of the user interface definition cached at client device 120 is outdated or that no user interface definition for the requested step of the workflow exists at client device 120, input processor can invoke user interface generator 134 to generate the user interface definition for the requested step of the workflow. In some cases, input processor 132 may invoke interface generator 134 with information identifying the requested step of the workflow and device-specific information.

Interface generator 134 may generate a user interface definition using the information received from client device 120 and transmit the user interface definition to client device 120 for rendering and execution by application 122. To generate the user interface definition, interface generator 134 uses the information identifying the requested step of the workflow and the context information to identify one or more plugins to select for populating the user interface definition. Interface generator 134 may populate the user interface definition according to a defined order in which the widgets associated with the one or more plugins are to be displayed to a user. Interface generator 134 may then transmit the user interface definition to client device 120.

Interface generator 134 may generate a user interface definition referencing web-based user interface components, semantic user interface components shared across different platforms, standard user interface components belonging to a specific platform (i.e., native interface components), or a combination thereof. The user interface definition may additionally reference one or more functions that can be invoked by the generated user interface. These functions may commit data to one or more data stores associated with application 122, transmit data to application server 130 for processing, or route user-provided data to one or more expert systems on the application server 130 for analysis (e.g., to guide a user through a workflow).

Because the user interface definition references one or more functions that can be executed through the generated user interface, but generally does not include the code for executing the one or more functions, application server 130 allows for the decoupling of a user interface and the application logic for performing a task. Thus, a user generally receives a user interface definition that is platform-specific, e.g., customized for the client device on which the user is executing application 122. The user interface definition interacts with underlying application logic that may be implemented as a single code base maintained independently from platform-specific code. Common application components need not be duplicated, updated, and tested for platform-specific versions of the same application. Changes in application logic (e.g., to support new variations of a workflow, to modify how data is processed at a specific step in a workflow, and the like) generally do not affect the functionality of a generated user interface, and updated application logic may be executed by client devices without building software artifacts to ensure compatibility with the updated application logic.

For example, suppose that application 122 is a tax preparation application executing on a client device 120 and that the user of client device 120 is attempting to provide wage income data to application 122. Interface generator 134 may identify multiple plugins that can be executed on client device 120 to allow a user to import wage income data into application 122. For example, one plugin may allow a user to capture one or more images of a document (e.g., as still images or a live stream from a camera integrated into or otherwise connected to client device 120) and provide the data extracted from the document to an API service 136. Because this plugin interfaces directly with device-specific capabilities, this plugin may include references to platform-specific logic and user interface elements tied to image capture and data extraction. The widgets included in this plugin may be standard widgets. Meanwhile, a second plugin may generate a form used to input data. The widgets included in this second plugin may be semantic widgets. Interface generator 134 may generate a user interface definition including references to both the image capture plugin (with the native code components needed to interact with the device-specific functionality) and the form entry plugin (with a form layout definition for the one or more data entry boxes to be displayed to the user) and transmit the user interface definition to client device 120 for execution.

In another example, suppose that application 122 is an accounting application executing on client device 120 and that a user of client device 120 is entering information from paper invoices into an accounts payable or accounts receivable account in the accounting application. Application 122 can reuse the image capture plugin discussed above. In conjunction with other plugins for extracting workflow-specific data from a captured image of a document, application 122 can extract relevant data from the captured image and provide the relevant data to an application server 130 hosting an API service 136 for performing accounting tasks.

Application server 130 may also host an application programming interface (API) service 136 that allows application 122 to invoke the functionality of the application hosted on application server 130. When API service 136 receives a query from a client device 120, API service 136 can verify that the received query is valid. If API service 136 determines that the received query is valid, API service 136 invokes the function specified in the query.

Plugin definition repository 140 generally stores plugin definitions defined for a specific section of a workflow. As discussed, these plugin definitions may reference one or more widgets defined in widget repository 150 and one or more functions exposed by API service 136 and stored in application logic repository 170. The widgets may define a layout of a user interface to be rendered on client device 120 and include a plurality of user interface components. In some examples, plugin definition repository 140 may be a versioned repository, and plugin version data may be updated as the configuration of a plugin changes.

Widget repository 150 may store data defining widgets that can be included in one or more plugins defined in plugin definition repository 140. As discussed above, the widgets may include semantic user interface components, standard user interface components, or a combination of semantic and standard user interface components. Widgets that do not depend on platform-specific functionality may be defined using semantic user interface components, while widgets that implement device-specific functionality, such as image capture, audio capture, notification generation, and other device-specific functions, may use standard user interface elements linked to native application logic.

User interface component repository 160 generally stores data defining common user interface components that may be used by one or more widgets to display a user interface on client device 120. In some cases, user interface component repository 160 may store user interface components that can be used across different computing platforms (i.e., they are platform-agnostic) and user interface components that may be specific to a particular platform (e.g., user interface components corresponding to functionalities of a particular type of device running a particular operating system). As discussed, a user interface definition generated by interface generator 134 may include data identifying the plurality of user interface components to be displayed on client device 120, and client device 120 can retrieve the identified user interface components from user interface component repository 160 or from user interface components deployed on the client device 120 based on whether the user interface components are platform-agnostic or have platform-specific functionality.

Figure 2:
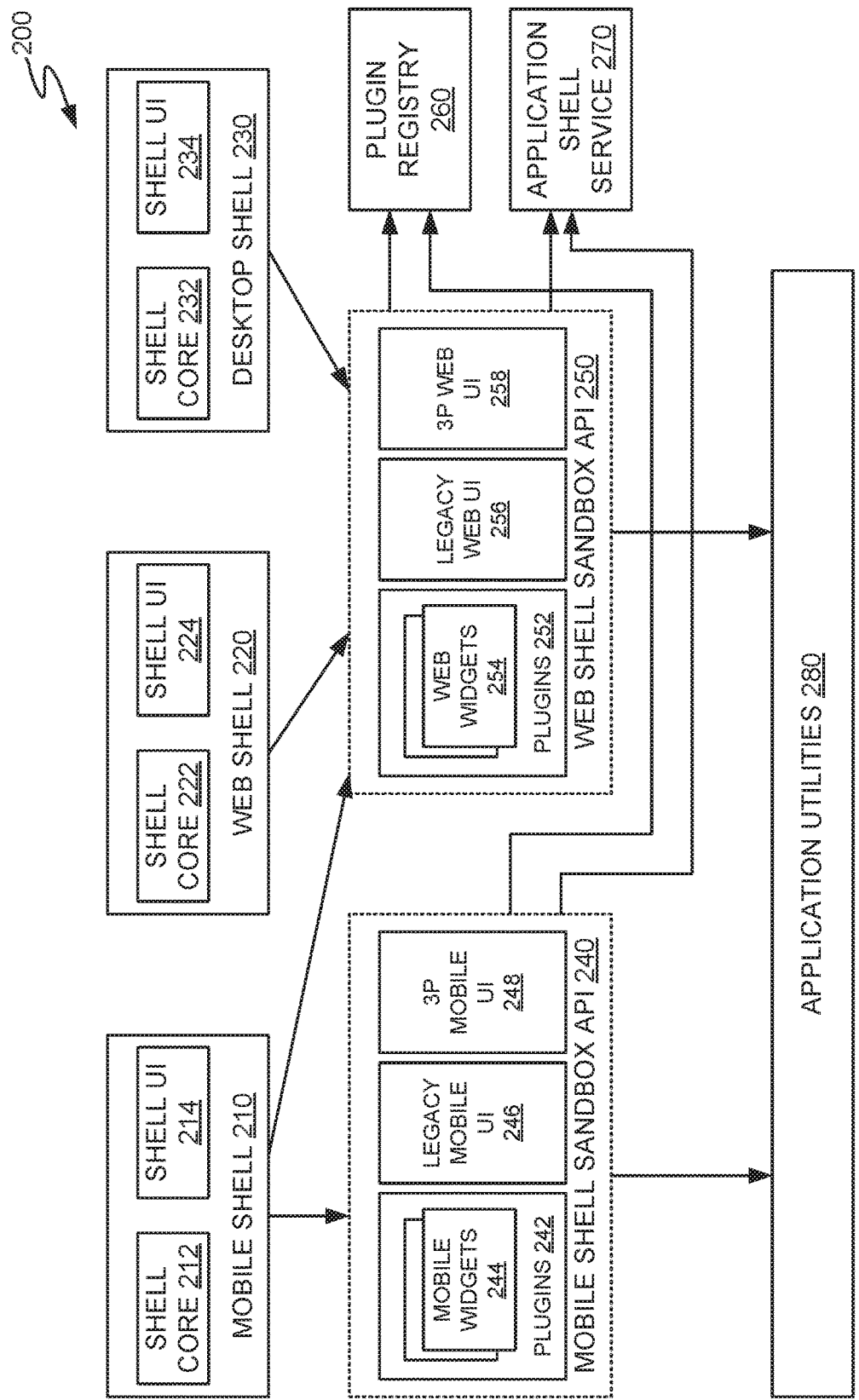
FIG. 2 illustrates an exemplary architecture in which user interfaces are dynamically generated and deployed to client devices executing a cross-platform application, according to one embodiment.

Application logic repository 170 may provide a versioned repository containing code contracts and other software artifacts for the functional code that can be executed within an application shell, such as shells 210, 220 and 230 of FIG. 2. Such an application shell may receive the workflow processed by application server 130 and display that workflow on client device 120. Code contracts may specify the functions performed by a part of an application, and correct ways to interact with that part. The code contracts stored in application logic repository 170 may be associated with one or more functions that a user can invoke through interaction with the one or more user interface components specified in a user interface definition and associated with a plugin associated with a step in the workflow. Each code contract may define, for example, the name of a function that a user can invoke, the required inputs for the function, optional inputs that may be, but are not required to be, provided in an invocation of the function, and the output generated by the function.

FIG. 2 illustrates an exemplary system architecture 200 for dynamically generating and deploying user interfaces in cross-platform applications, according to an embodiment. As illustrated, system architecture 200 generally includes a mobile shell 210, a web shell 220, and a desktop shell 230, each of which may communicate with one or more shell sandbox APIs, such as mobile shell sandbox API 240, and web shell sandbox API 250 to access application utilities and other capabilities provided by a shell runtime, as discussed in further detail herein.

Each shell 210, 220, and 230 may allow for the dynamic generation of customized user interfaces and user experiences for applications executing within the shell. Each shell may be made available (e.g., via one or more data repositories) as a library that may be versioned. Native mobile application developers may use mobile shell 210 as a library and package mobile shell 210 as part of an application. Web shell 220, however, may be hosted by an application server, such as application server 130 in FIG. 1, for a specific software product. In some aspects, native desktop shell 230 may use similar components as web shell 220, because native desktop shell 230 may be configured to encapsulate a web interface to deliver a software product to a user.

Shells 210, 220, and 230 may use consistent APIs across platforms. While the implementation of API functions may differ between mobile shell 210, web shell 220, and desktop shell 230, APIs may be defined according to consistent code contracts that define required inputs, optional inputs, and required outputs for each function exposed by the API. The inputs and outputs may be defined, for example, as a variable name and a variable type indicating a data type associated with each named variable to be provided as input into a function or generated as output by the function. To promote code reuse across shells 210, 220, and 230, cross-platform code (e.g., code written in JavaScript, PHP, or other languages that can be executed in various computing environments with similar execution results) may be used to implement shells 210, 220, and 230. In some aspects, each of shells 210, 220, and 230 may include functionality tailored to the unique capabilities of each platform. For example, because mobile devices may have less computing power than desktop computers, laptop computers, or cloud computer farms on which an application may be executed, mobile shell 210 may additionally include support for hydration. The term hydration generally refers to a set of processes for loading objects in an application. In such a process, an object may be loaded as a framework, without the complete data associated with that object. Then, when needed the rest of the data may be loaded into that object framework. For example, mobile shell 210 may allow data to be stored in memory, but not loaded into an object until the object is to be used.

Each shell 210, 220, and 230 allows for the creation of dynamic user interfaces by utilizing a variety of relevant plugins, as discussed above. The plugins selected by a shell 210, 220, or 230 may include user interface elements for display on a client device, such as client device 120 of FIG. 1, may be selected based on the context in which a user is executing an application, such as application 122 of FIG. 1, and, in some embodiments, the type of device on which the application is executing.

A plugin may include a plurality of widgets, which are self-contained software components that expose a specific application feature. Examples of widgets may include navigation bars that allow a user to move between different steps of a workflow executed within application 122, progress bars that display an amount of the workflow that a user has completed (and correspondingly an amount of the workflow that remains to be completed), application-specific features, features that leverage hardware present on the computing device on which application 122 is executing (e.g., image capture using one or more cameras integrated into a client device 120, authentication using one or more biometric data capture devices integrated into a client device 120, etc.), and so on. A plugin which includes a set of related widgets may be used to represent sections of an application workflow. Because such a plugin is self-contained, applications may be decomposed into a plurality of independently maintainable components which may be maintained (e.g., debugged, updated, extended, etc.) by different development teams.

Each plugin may include two parts: a configuration and one or more widgets. The configuration generally identifies the widgets included in the plugin, a code contract, permissions, the behavior of the plugin, and intended interactions with other parts of an application. In some embodiments, legacy code components (e.g., native code components that were created for previous versions of a software product and are intended to be reused in a cross-platform application) and third party components (e.g., extensions to an application) may have their functionality added to a plugin with a minimal amount of code refactoring. The user interfaces associated with legacy components or third party components may be projected as a widget that can be loaded into a shell 210, 220, and/or 230 via a widget shim layer.

Each plugin and widget may be registered in a central configuration service such as plugin registry 260. By registering plugins and widgets in plugin service 260, and by defining plugins as a configuration and a plurality of widgets, different technology stacks may be deployed for different versions of a cross-platform application. A technology stack is the set of programs, systems and services that deliver an application to an end-user. A technology stack for a web-hosted application may include several individual programs, systems or services, while in some situations a technology stack for a native application may be as simple as only the executable program running on the end-user device. For example, an application deployed via web shell 220 and/or native desktop shell 230 may deploy a technology stack including Javascript libraries such as Dojo, JQuery, or Angular, and other technologies that may be used to deploy a web-based version of a cross-platform application, regardless of whether the application is being deployed in a web browser or a native application that includes a web browser component. Similarly, an application deployed via mobile shell 210 may deploy a technology stack including native code components (e.g., Java components for applications deployed on Android devices or Objective C components for applications deployed on mobile device operating systems, such as iOS, Windows Mobile, and the like), and other technologies that may be used to deploy a native mobile version of the cross-platform application.

Mobile shell 210 generally is an application that executes on a mobile device (e.g., a smartphone, handheld computer, or tablet computer) and integrates web-based UIs and native mobile UIs to create a customized application that is tailored to the capabilities of the mobile device on which mobile shell 210 executes. To integrate web-based UIs and native mobile UIs, a web shell 220 may be integrated into mobile shell 210 at runtime. UI components that are executed as a web component (e.g., web forms, hypertext markup language (HTML) UI elements, and the like) may be executed within the web shell 220. Meanwhile, mobile shell 210 may additionally make use of device-specific capabilities using native mobile UIs and code components. These device-specific capabilities may include, for example, integrated cameras for image capture and data extraction, movement or location tracking devices (e.g., accelerometers, satellite positioning system (Global Positioning System (GPS), GLONASS, GALILEO, etc.) receivers or cellular-assisted satellite positioning systems), and other device-specific capabilities that widgets can leverage to perform actions related to an application hosted in mobile shell 210.

The web shell 220 integrated into mobile shell 210 can delegate one or more actions to the mobile shell 210 via a programmatic bridge, which allows for applications executed within mobile shell 210 to be customized and optimized for different kinds of mobile devices. In one example, customization and optimization of an application executing in mobile shell 210 may include the use of different image capture modules based on the capabilities of a mobile device on which the mobile shell 210 is executing.

For lower-cost devices with slower processors, the image capture module executed in mobile shell 210 may, at least in part, offload image processing to a cloud service or another computing device, while for higher-cost devices with more processing power, the image capture module executed in mobile shell 210 may perform image processing and data extraction on the mobile device itself. In another example, the customization and optimization of an application executing in mobile shell 210 may include customizations based on the screen size and screen resolution of the device on which mobile shell 210 is executing. For a mobile shell 210 executing on a smartphone, navigation components may be hidden until requested by a user, while navigation components may be displayed in a mobile shell 210 executing on a mobile device having a larger screen (e.g., a tablet computer). In another example, a mobile shell 210 executing on a smartphone with a high-resolution screen (e.g., a QHD (2560 pixels by 1440 pixels), 4K (3840 pixels by 2160 pixels), or 8K (7680 pixels by 4320 pixels) screen) may receive user interface elements that are scaled for high-resolution screens, while a mobile shell 210 executing on a smartphone with a lower-resolution screen (e.g., a 720p (1280 pixels by 720 pixels) or 1080p (1920 pixels by 1080 pixels) screen) may receive user interface elements that are scaled for lower-resolution screens.

Shells 210, 220, and 230 may host a variety of applications that use shared user interface components to implement different functionality. To reduce the storage and memory footprint of an application hosted within a shell, shells 210, 220, and 230 generally load widgets and plugins based on the application hosted within the shell. For example, a tax preparation application may load a first set of widgets and/or plugins (e.g., tax liability/refund calculators, a completeness engine, tax support modules, emotional response modules, and the like). An accounting application, on the other hand, may load a different set of widgets and/or plugins (credit/debit calculators, statement generators, and the like), as the functionality of the accounting application may not require the functions exposed by the widgets that the tax preparation application requires.

Shells 210, 220, and 230 may provide and implement a widget specification. The widget specification may be a description of UI widgets that is not tied to any particular technology or programming language. The widgets that are loaded into shells 210, 220, and 230 are generally not dependent on the specific implementation of a shell 210, 220, or 230. Rather, the widgets may depend on a sandbox application programming interface provided by a shell. The web shell sandbox API 250 may be common to all platform-agnostic widgets. As illustrated in FIG. 2, mobile shell 210 exposes a mobile sandbox API 240 and a web shell sandbox API 250, while web shell 220 and native desktop shell 230 expose the web shell sandbox API 250. Sandbox APIs 240 and 250 generally provide widgets with access to shell services, such as common capabilities, application context, authentication, and the like. Because the widgets depend on a sandbox API 240 and/or 250, widgets can be built with minimal dependency on a particular shell 201, 220 or 230, which allows widgets to be embeddable into any application that executes or is hosted within a shell 210, 220, or 230.

Shells 210, 220, and 230 additionally provide mechanisms to enable widgets hosted within a shell 210, 220, or 230 to communicate with other widgets hosted in the shell. The communications mechanisms provided by a shell may provide for asynchronous communications between different widgets. These communications may be, in some cases, event driven (e.g., triggered when some condition occurs within an application hosted by a shell, such as user interaction with a graphical user interface element, expiry of a timer, etc.).

Shells 210, 220, and 230 generally provide support for login, user authentication, and hydration of user interface widgets. For login and user authentication, shells 210, 220, and 230 may include modules for username/password authentication, biometric authentication, possession-based authentication, or a combination of authentication methods (multi-factor authentication). Biometric authentication modules may interact with a variety of authentication data capture devices on a client device, such as front-facing cameras on tablets or smartphones, web cameras on laptop or desktop computing devices, fingerprint readers, iris scanners, or other biometric devices for user authentication to allow for user enrollment and authentication.

Shells 210, 220, and 230 may be configured to support extensions. Support for extensions allows existing applications to add to the capabilities of the shells and customize shells for application-specific needs. For example, multiple hydration extensions may be made available for use in applications hosted within a shell 210, 220, or 230. These extensions may provide different mechanisms for mapping data into data objects for use in an application (or a portion of an application).

As illustrated, each shell 210, 220, and 230 includes a shell core 212, 222, 232 and a shell user interface 214, 224, 234. The shell cores 212, 222, 232 may include a shell kernel that manages the lifecycle of an application hosted within a shell 210, 220, or 230 and the user interface 214, 224, 234 rendered according to a device-specific user interface definition, as discussed herein. Lifecycle management generally includes initialization of an application, termination of an application, deferring of actions, pausing of an application (e.g., when an application is minimized or otherwise placed in a suspended state), state recovery (e.g., when an application is maximized or otherwise reactivated from a suspended state), and the like. Shell cores 212, 222, 232, may further provide support for hydration, plugin/widget management, event handling asynchronous communications, and shell extension and customization.

Shell user interfaces 214, 224, 234 render the user interface that is dynamically generated based on client device information and the workflow that a user is executing. Shell user interfaces 214, 224, 234 provide layout and navigation management, flow control (e.g., to control the transition from one step to another step of a workflow implemented by an application hosted in shells 210, 220, or 230), user login/authentication, intra-application communications, and the like. Shell user interfaces 214, 224, 234 may be barebones (or blank) user interfaces. Applications hosted within a shell 210, 220, or 230 can populate shell user interface 214, 224, 234 with the graphical user interface elements to be rendered in order to enable a user to perform one or more tasks.

As illustrated, shell sandbox APIs 240 and 250 allow for execution of a variety of plugins and widgets. The specific plugins and widgets made available by in sandbox APIs 240 and 250 may be determined based on a type of device being used. That is, native mobile widgets may be executed using mobile shell sandbox API 240, while web widgets may be executed using web shell sandbox API 250. As illustrated, mobile shell sandbox API 240 supports the execution of plugins 242 including one or more mobile widgets 244, a legacy mobile UI 246 (e.g., a UI associated with legacy code monoliths integrated into architecture 200), and third party mobile UIs 248 associated with extensions to one or more applications. Web shell sandbox API 250, which may be used by any of mobile shell 210, web shell 220, and desktop shell 230 for the execution of web-based widgets, supports the execution of plugins 252 including one or more web widgets 254, a legacy web UI 256 associated with legacy code monoliths integrated into architecture 200, and third party web UIs 258 associated with extensions to one or more web applications. Third party UIs 248 and 258 may be developed and deployed by other developers for integration into one or more software product offerings that may be executed within a shell 210, 220, or 230.

Shell sandbox APIs 240 and 250 may provide access to application utilities 280 and common capabilities provided by a shell runtime. These utilities and common capabilities may include, for example, activity logging, analytics, authorization context tracking, application context tracking, and so on. The shell sandbox APIs 240 and 250 may provide a versioned public code contract that defines how consumers (i.e., different widgets and plugins, regardless of whether a widget or plugin is a first-party widget or plugin or a third-party widget or plugin) interact with the sandbox and the functionality exposed by shell sandbox APIs 240, 250. At runtime, shells 210, 220, and 230 can create an instance of a sandbox and make the sandbox available to widgets at runtime, and the widgets loaded into a shell 210, 220, or 230 can access sandbox-provided services according to the versioned public contract. In some aspects, the sandbox APIs 240, 250 may be extended by applications hosted in a shell 210, 220, or 230 to add application-specific features and behavior.

As discussed, application utilities 280 may be provided to widgets and plugins via one of shell sandbox APIs 240 or 250. In some cases, the utilities may include an application shell service 270, which manages bootstrapping for each shell. In order to perform this bootstrapping, application shell service 270 communicates with a plugin registry 260 and services specific to each platform, to obtain the relevant bootstrap data, which may be customized for a specific application and platform (e.g., for application X on mobile, on web, and on desktop/laptop computers). The application shell service 270 for each platform may be backed by a common schema that defines the services provided by an application shell service 270 and rules for interacting with the services (e.g., API function calls, required and optional parameters, and the like). In some aspects, a mobile version of application shell service 270 may define a default bootstrap configuration that may be packaged with a mobile application to optimize the performance of the mobile application.

Plugin registry service 260 represents a centrally managed service that manages the plugin configurations that may be used by applications hosted in shells 210, 220, 230. The plugin registry service 260 may be responsible for delivering applicable configuration data for a specific application.

Figure 3:
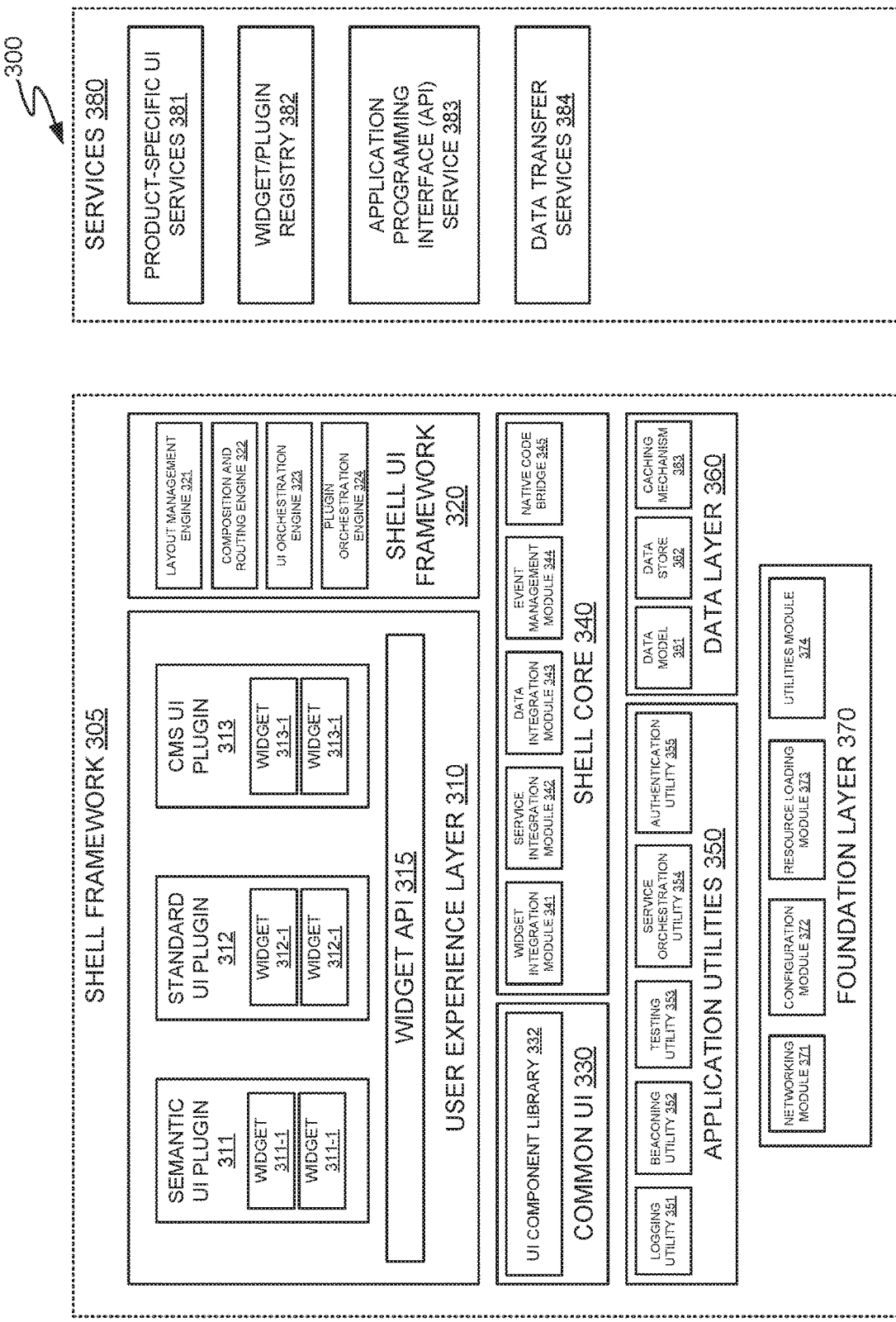
FIG. 3 illustrates an exemplary shell framework architecture for dynamically generating and deploying user interfaces to client devices executing a cross-platform application, according to one embodiment.

FIG. 3 illustrates an example shell architecture 300 for dynamically generating and deploying user interfaces in cross-platform applications, according to an embodiment. As illustrated, shell architecture 300 generally includes a shell framework 305 and services 380.

Shell framework 305 generally comprises a majority of the application code and provides the underlying architecture that enables the dynamic generation of user interfaces for applications based on user context, device information, and so on. As illustrated, shell framework 305 includes a user experience layer 310, a user interface framework 320, a common user interface layer 330, core services 340, application utilities 350, application data 360, and foundation layer 370.

User experience layer 310 generally hosts a plurality of plugins 311, 312, 313, 314 and a widget API 315. Semantic UI plugin 311 generally hosts a plurality of cross-platform widgets 311-1. The cross-platform widgets 311-1 generally are widgets that may be rendered on a variety of platforms in either native application shells or a web shell executable within a web browser.

Standard UI plugin 312 generally hosts a plurality of device-specific widgets 312-1 which may implement a variety of device-specific features.

Content Management System (CMS) UI plugin 313 generally hosts a plurality of widgets 313-1 that are used to implement a content management system within an application hosted within a shell. These CMS widgets 313-1, for example, provide document versioning, document tracking, and other services that can be used to manage documents uploaded and created by an application.

Shell UI framework 320 generally implements one or more modules that aid in rendering a user interface on a device. As illustrated, shell UI framework 320 generally includes a layout management engine 321, composition and routing engine 322, UI orchestration engine 323, and plugin orchestration engine 324. Layout management engine 321 generally uses information in a device-specific user interface definition to determine an order in which plugins, widgets, and the associated user interface elements are displayed on a device. Composition and routing engine 322 generally renders the user interface on a device and instantiates one or more event handlers to route user interaction to the appropriate function or code module for processing. UI orchestration engine 323 is generally a data-driven engine that uses data input into an application to orchestrate events that are invoked within an application. Plugin orchestration engine 324 generally orchestrates communications between different plugins, as discussed above.

Common UI 330 generally includes common user interface components that are shared across different versions of a shell (i.e., shared across native mobile shell 210, web shell 220, and native desktop shell 230). As illustrated, common UI 330 includes a UI component library 332 that may include information defining the various shared user interface components that can be rendered on a device. A plugin can reference specific components defined in UI component library 332 in a definition of the visual layout or organization of the plugin. When shell UI framework 320 renders the plugin, shell UI framework 320 accesses UI component library 332 to obtain definitions of the common UI components and renders the plugin according to the obtained definition.

Shell core 340 generally hosts one or more modules that enable execution of applications within an application shell. As illustrated, shell core 340 includes, among other modules, a widget integration module 341, service integration module 342, data integration module 343, event manager 344, and a native code bridge 345.

Application utilities 350 generally include the common utilities leveraged by various applications during execution. These utilities may include, among others, a logging utility 351, a beaconing utility 352, testing utility 353, service orchestration utility 354, and authorization utility 355. These utilities, as discussed above, may be implemented according to a code contract that is consistent across different shells so that application utilities 350 work consistently across different platforms.

Application data layer 360 generally entails a data storage repository in which data models and user data is stored and mechanisms for storing data at a local device and writing the data to a remote source. Data models 361 generally define relationships between data objects that are used within an application. The definitions may include the names of variables, data types, and other information that defines a data object and the interactions between different data objects. Data store 362 may be a relational or non-relational database that stores user data according to one or more of data models 361. A caching mechanism 363 may be included in application data layer to orchestrate the transmission of data to a remote source for commitment to a remote database.

Foundation layer 370 generally includes modules that interact with device hardware and define the low-level behavior of an application shell 305. As illustrated, foundation layer 370 includes a networking module 371, configuration module 372, resource loading module 373, and utilities module 374. Networking module 371 generally provides an interface through which an application executing within an application shell communicates with other computing devices. This interface may include, for example, functions that convert data into a bitstream that may be encapsulated into one or more packets for transmission to another device via a network interface, such as a wired interface, an 802.11 wireless interface, a cellular wireless interface, or other data transfer interfaces. Configuration module 372 generally configures the application shell 305 for execution on a specific device. Resource loading module 373 allows an application executing within an application shell to reserve resources (e.g., temporary and/or persistent memory, CPU time, etc.) on a device to allow for execution of the application. Utilities module 374 generally provides basic utilities that the application shell 305 uses for error recovery, memory management, and other purposes.

As discussed, widgets and plugins hosted within an application shell 305 may interact with various services 380 through, for example, service integration module 342 in shell core 340. As illustrated, the services that support execution of applications within an application shell 305 may include product-specific UI services 381, a plugin repository 382, an API service 383, and data transfer services 384. Product-specific UI services 381 generally provide product-specific user interface data to an application executing in application shell 305. As discussed in detail above, an application shell 305 can interact with widget/plugin registry 382 to retrieve the appropriate version of a plugin and the widgets identified in a plugin definition for rendering on a user device. During execution of an application, the application may invoke one or more functions of a remote processing system represented by API service 383, which defines the functions that can be invoked by the application, the required and optional data inputs, and the type of data returned in response to the function call (if any). To invoke a function exposed by API service 383, a data transfer service 384 may provide a gateway between the application executing on a client device and the API service. The gateway may receive a request from a client device, generate and invoke a function call based on the received request, receive data from API service 383, and return the received data to the client device on which the application shell 305 is executing.

Figure 4:
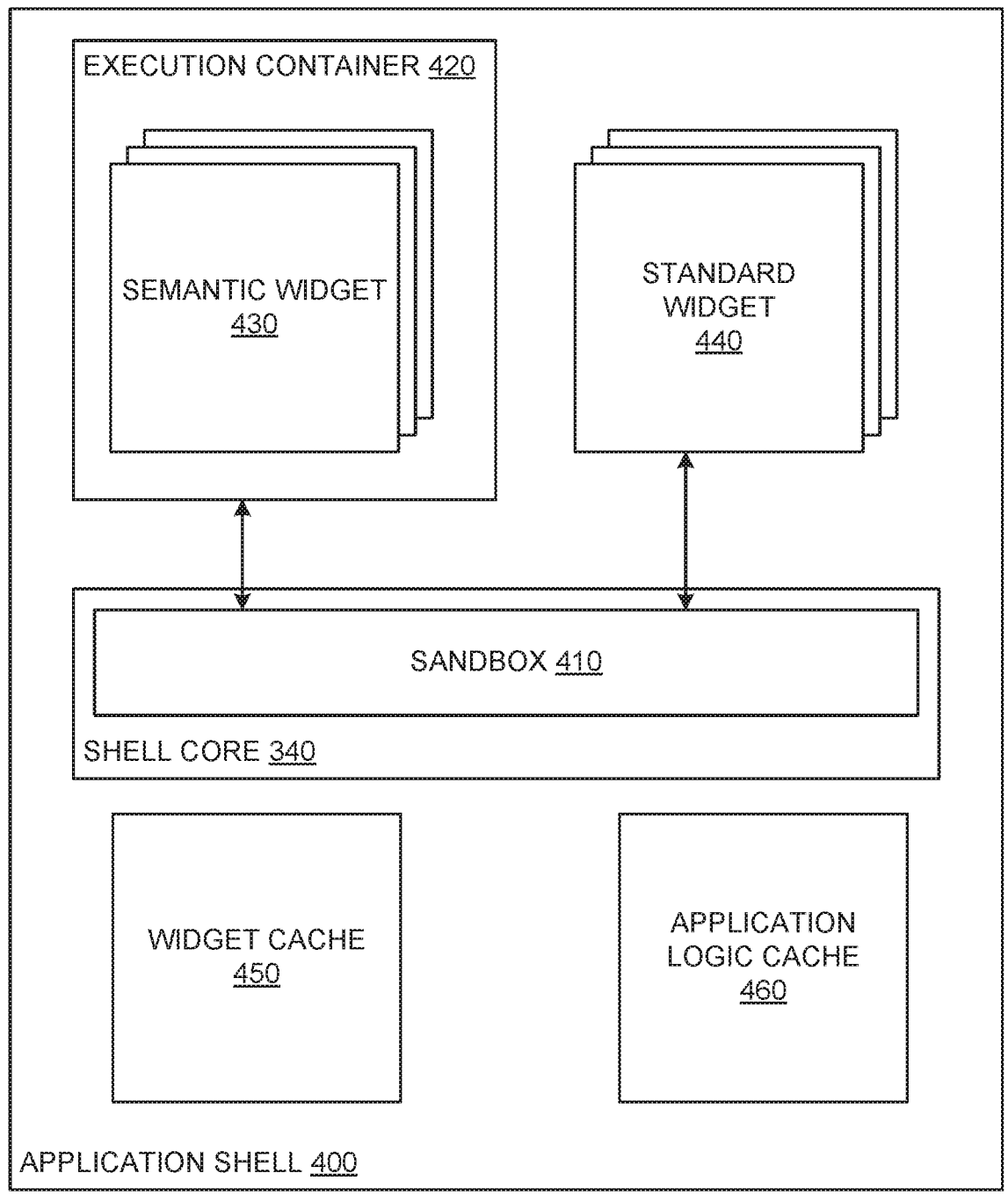
FIG. 4 illustrates an application shell according to one embodiment.

FIG. 4 illustrates an example application shell 400 according to one embodiment. As illustrated, application shell 400 includes a shell core, illustrated as shell core 340 of FIG. 3, a sandbox 410, an execution container 420, a plurality of semantic widgets, among them semantic widget 430, a plurality of standard widgets, among them standard widget 440, a widget cache 450 and an application logic cache 460. Application shell 400 may be a mobile shell 210, a web shell 220 or a desktop shell 230 as shown in FIG. 2. Application shell 400 may execute on a local computing device, such as client device 120 of FIG. 1, to execute a cross-platform application, such as application 122 of FIG. 1. Although only semantic and standard widgets are shown in application shell 400, other embodiments may include other varieties of application widgets.

Application shell 400, through shell core 340, may manage the overall workflow of a cross-platform application. This may include managing the lifecycles and interactions of all widgets used in the application, as discussed above with respect to shell cores 212, 222, 232 of FIG. 2. For example, application shell 400 determines when to create a widget such as semantic widget 430 or standard widget 440. Application shell 400 may also determine when to terminate a widget, such as when a widget has completed the event it was created to handle. For example, standard widget 440 may be created to obtain a particular input from a user of the application. When the input is obtained, application shell 400 may pass the input to other widgets of the application, and terminate standard widget 440 to free device resources allocated to standard widget 440. In this way, the application shell 400 may reduce the demand on the host for processing resources.

As stated, application shell 400 may also manage the interaction and communication between widgets. In some embodiments, this includes facilitating communication between widgets that are not configured to communicate directly with one another. For example, as illustrated, semantic widget 430 may be executing within execution container 420 and standard widget 440 may be executing outside execution container 420. Execution container 420 may provide a standardized environment for widgets to execute in. Semantic widgets may be able to execute on a plurality of platforms. By executing within an execution container, such as execution container 420, consistent performance and appearance may be achieved for semantic widgets across different platforms. When widgets on either side of execution container 420 wish to communicate, application shell 400 may process communications from one widget and send the communication along to the intended receiving widget.

Application shell 400 may allow a widget to listen for an event that a second widget is configured to capture or create. Application shell 400 may utilize sandbox 410 to perform this task. Sandbox 410 may perform similar functions to mobile shell sandbox API 240 and web shell sandbox API 250, as shown in FIG. 2. For example, in a tax preparation application, semantic widget 430 may be created to track a total tax refund amount. If so, semantic widget 430 may seek input from the user throughout the workflow of the application. Standard widget 440 may be created to obtain a user input to the query "how much interest did you pay on student loans this year?" or various other questions related to tax information. To obtain this input from standard widget 440, semantic widget 430 may send a request to sandbox 410 to listen for the event of user input on standard widget 440. Sandbox 410 may process this request and, upon the event occurring, may capture the input from standard widget 440 and pass it on to semantic widget 430. Semantic widget 430 may then display an updated tax refund total.

One benefit of the process used in the previous example is that semantic widget 430 does not have to know ahead of time when the specified event will occur. An event such as user input does not occur at any specific time frame. In fact, there may be a great deal of time in between user inputs for a particular application. The application shell 400 allows for events with an unknown occurrence time to be listened for and relayed to listening widgets.

Widget cache 450 is a local counterpart to a remote widget repository, such as widget repository 150 of FIG. 1. Widget cache 450 maintains a local version of all widgets needed in an application. Semantic widget 430 and standard widget 440 are both maintained in widget cache 450 before being loaded by application shell 400. Widget cache 450 receives and stores widgets transmitted to it by an application server, such as application server 130 of FIG. 1. If a widget is determined to be out of date by application shell 400 and/or application server 130, application server 130 may transmit a new version of the widget to be stored in widget cache 450.

Application logic cache 460 is a local counterpart to a remote application logic repository, such as application logic repository 170 of FIG. 1. Application logic cache 460 maintains a local version of the code contracts and other software artifacts for the functional code implementing the workflow processed by a remote application server, such as application server 130 of FIG. 1, and displayed on a local computing device, such as client device 120 of FIG. 1. Application logic cache 460 may receive updated code contracts and software artifacts from application logic repository 170 if application shell 400 and/or application server 130 determine the code contracts and software artifacts stored locally are out of date.

Figure 5:
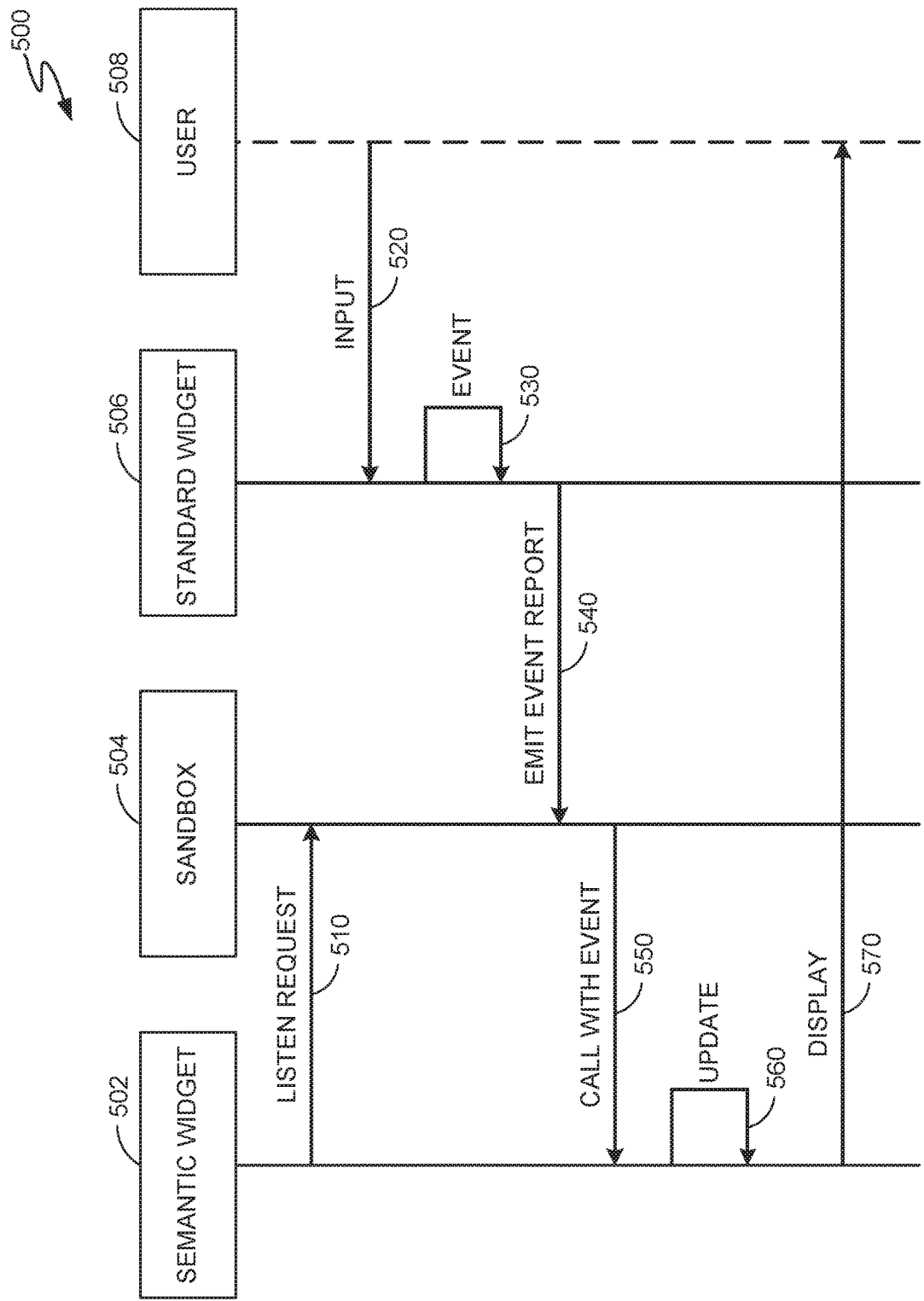
FIG. 5 illustrates an example method for an application shell to manage an event listening request from a semantic widget, according to one embodiment.

FIG. 5 illustrates an example method 500 for a sandbox 504 to manage an event listening request from a semantic widget 502, according to one embodiment. As illustrated, method 500 involves semantic widget 502, sandbox 504, standard widget 506 and user 508. Although shown illustratively as a semantic widget and a standard widget, varieties of other widgets, or combinations thereof, may request and respond to event listening requests.

Method 500 begins at 510, where semantic widget 502 sends a listen request to sandbox 504. The particular listen request of 510 may be to listen for an event by a different widget, but other types of listen requests are possible. For example, listen request 510 may originate as a widget creation request from a parent widget. A parent widget may create a child widget for a number of tasks. For example, a widget may require user input, and so may create a child widget to capture this input. However, if a semantic widget needs to create a standard widget to capture the input, this process may be difficult for the semantic widget to perform. Such a parent widget may request creation of a child widget from an sandbox, such as shells 210, 220 and 230 of FIG. 2. A parent widget may be informed when the child widget completes its event.

An event listen request may have defined criteria, which may specify the type of event to listen for or a particular widget to listen for events from. After receiving the listen request, sandbox 504 processes the request and may check future communications from other widgets to determine if such communication matches the criteria of the listen request.

At 520, a user 508 of an application inputs data captured by standard widget 506. The data may be captured via selecting an item from a drop-down menu, choosing a radio button from a list, entering text into an empty text field, or interacting with other user interface elements.

At 530, the user input of 520 causes an event within standard widget 506. This event may include standard widget 506 processing the input, checking the input for correctness, checking the input for consistency with previously input data, determining the input constitutes data, computing data from the input to generate data relevant for a later step of the application's workflow, generating a label for the received data, or other various processes.

At 540, standard widget 506 emits an event report to sandbox 504. All widgets may be configured to report every event to sandbox 504. This event report may include the user input of 520, data generated by standard widget 506 based on the user input of 520, or a label of data generated by standard widget 506.

At 550, sandbox 504 receives the event report, processes it, determines whether or not the event report matches the criteria of the listen request, and calls semantic widget 502 with the event if the event report matches the criteria. This call may include the data obtained from the user input of 520, data processed by the standard widget 506, labels generated by the standard widget 506, or data computed by standard widget 506 based on the user input of 520.

At 560, semantic widget 502 updates itself based on the call received from sandbox 504. This update may be based in whole or part on the data obtained from the user input. For example, in a tax preparation application, the data received may be an amount of a deductible expense, and the update may involve calculating and displaying an updated total for a tax refund amount. At 570, semantic widget 502 displays an updated version of its user interface elements to reflect the update of 560.

Figure 6:
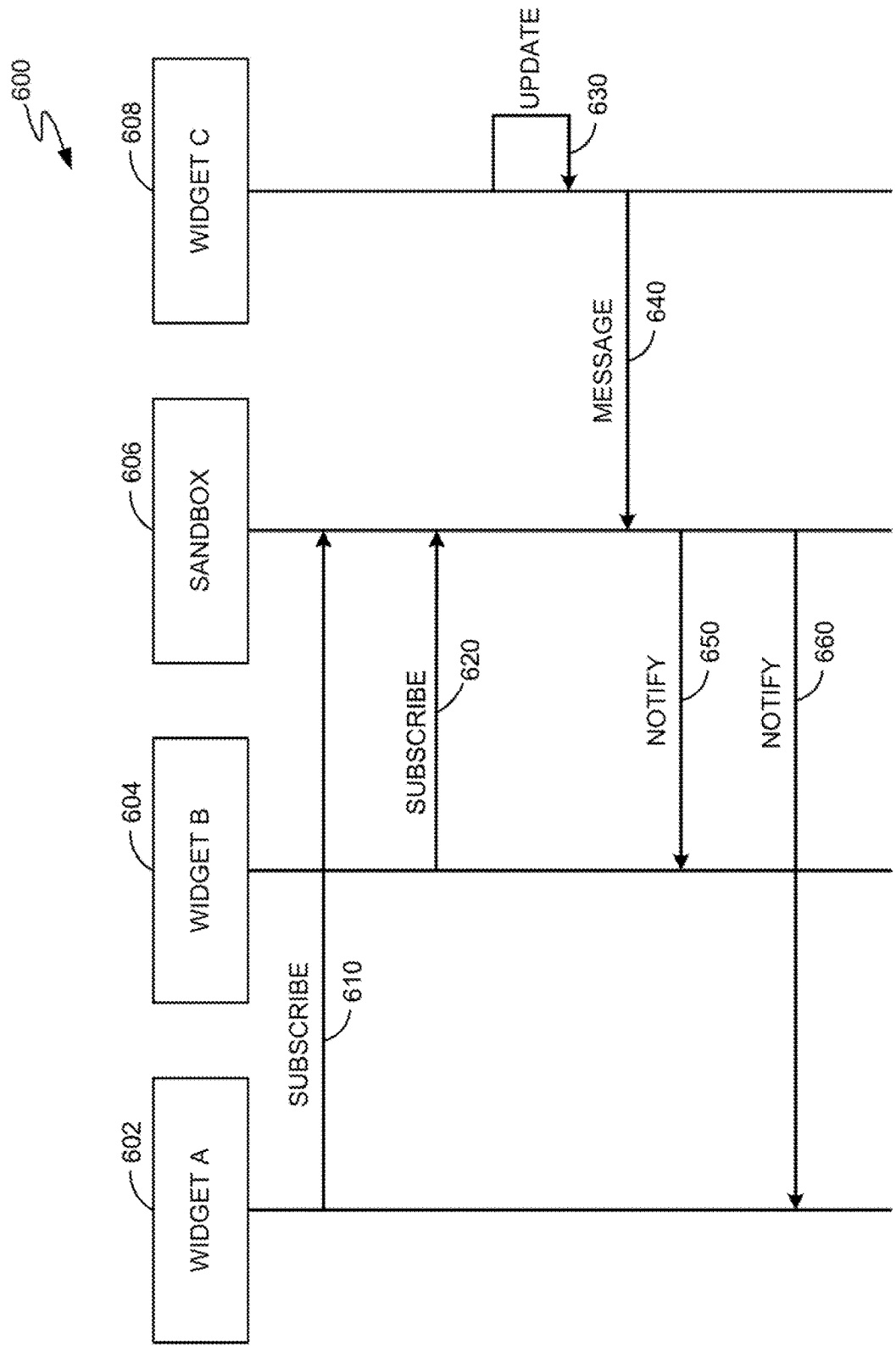
FIG. 6 illustrates an example method for an application shell to manage a notification request, according to one embodiment.

FIG. 6 illustrates an example method 600 for an sandbox 606 to manage a notification request, according to one embodiment. As illustrated, method 600 involves widget A 602, widget B 604, sandbox 606 and widget C 608.

Method 600 begins at 610, where widget A 602 sends a subscription request to sandbox 606. A subscription request is a request to listen for messages relating to a certain topic. A message may be related to a topic if it specifies that topic in a header, or if it contains certain keywords related to that topic. A subscription request may be valid for a certain period of time, for the life of the subscribing widget, or may be based on the occurrence of a particular event. In this example, widget A 602 is requesting to subscribe to messages relating to topic 1. After receiving the subscription request, sandbox 606 processes the request and may check future communications it receives to determine if a received communication is related to topic 1.

At 620, widget B 604 also sends a subscription request to sandbox 606. In this example, widget B 604 is also requesting to subscribe to messages relating to topic 1. Sandbox may handle this request identically to the request from widget A 602.

At 630, widget C 608 is updated, meaning a change has taken place within widget C 608 or data that widget C 608 manages has changed. This update may be caused by receipt of data from a different widget, by receipt of a communication from the sandbox, by input from a user of the application, or a number of other update sources.

At 640, widget C 608 sends a message to sandbox 606 relating to topic 1. For example, the message may specific in a header that it is a message relating to topic 1. The message may be based on or generated because of the update of 630. The message may contain data relevant to other widgets, such as widget A 602 or widget B 604. For example, widget A 602 may rely on data produced by widget C 608 to complete the task performed by widget A 602.

At 650, sandbox 606 notifies widget B 604 of the message from widget C 608. At 660, sandbox 606 also notifies widget A 602 of the message from widget C 608. This notification may be identical to the notification sent to widget B 604. A notification may include data captured or produced by widget C 608, which data may be needed by other widgets in the application. The notifications to the two widgets may be sent simultaneously, that is, in parallel, or may be sent sequentially. This method may allow a widget of the application to send a message to a large number of other widgets, or all other widgets of the application, at once or in close succession. This may be useful when a particular widget of an application manages or captures data that may be useful to the overall workflow of the application. In this example, widget C 608 may manage data useful to the overall workflow.

Figure 7:
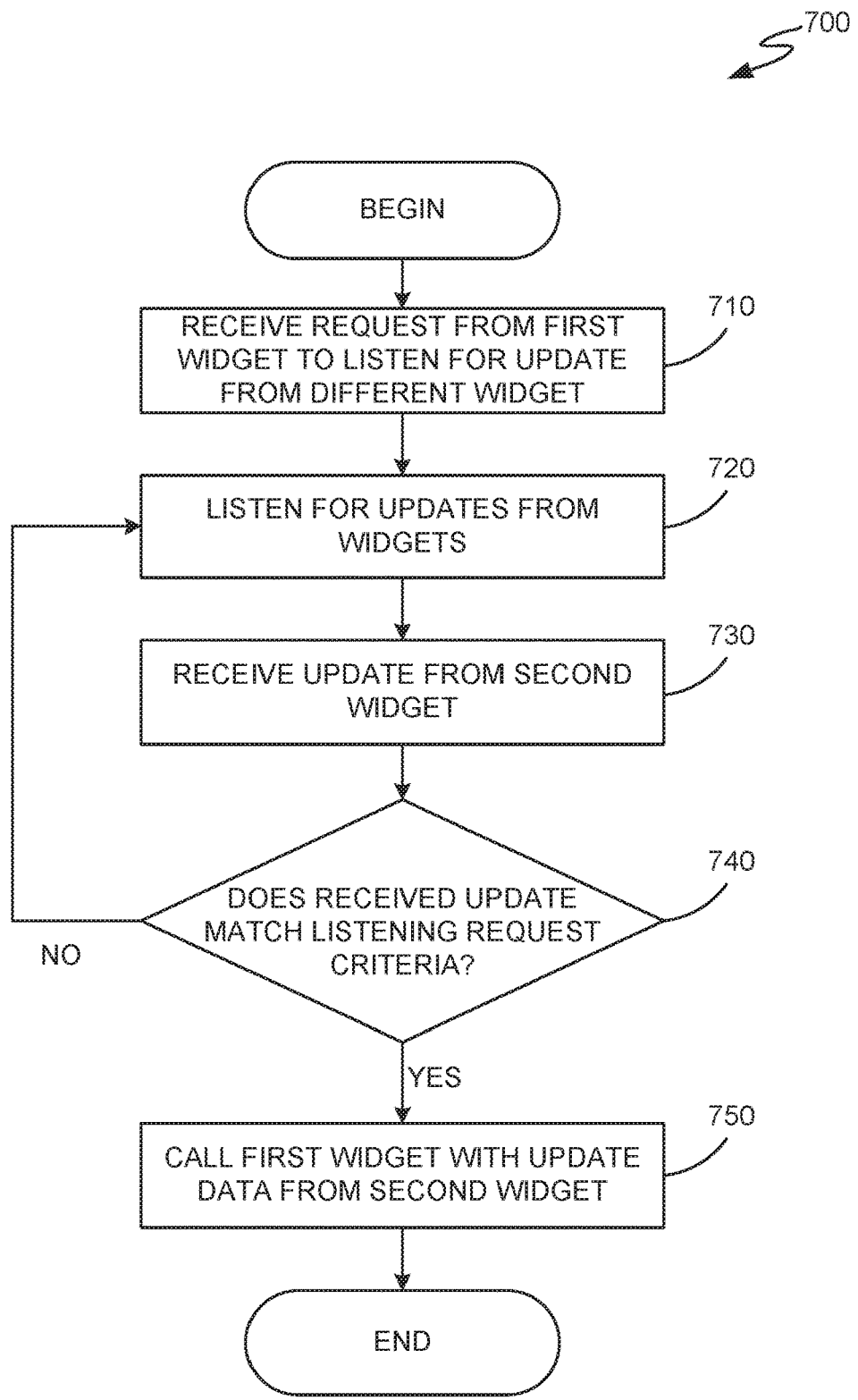
FIG. 7 illustrates example operations for managing listening requests between widgets.

FIG. 7 illustrates example operations 700 for managing listening requests between widgets by a sandbox according to one embodiment.

Operations 700 begin at step 710, where the sandbox receives a request from a first widget to listen for an update from a different widget. This listening request may be a request to listen for all updates from a specified widget, to listen for a specified event from a specified widget, to listen for a specified event from an unknown widget or various other types of requests. The timing of the event listened for can be either expected, as in the expiry of a timer, or unexpected, as in input from a user.

At step 720 the sandbox begins to listen for updates from other widgets based on the request received at step 710. Although the sandbox may begin listening for this request at this step, a sandbox may generally be in regular communication with all widgets of the application. As an example, the sandbox may already be listening for updates from widgets based on a preexisting listening request.

At step 730 the sandbox receives an update from a second widget. At step 740 the sandbox determines if this received update matches the criteria for the listening request received in step 710. Such a determination may entail matching the type of event against the criteria of the listening request, or matching the second widget against the criteria. If the update does not match the criteria of the listening request, operations 700 returns to step 720 and resumes listening for communications from widgets. If the update does match the criteria operations 700 proceeds to step 750.

At step 750 the shell application calls the first widget with update data obtained from the second widget. The first widget has thus received a communication, albeit indirectly, from the second widget. The second widget may, at the same time as sending the update in step 730, request to listen for updates from the first widget. If so, the two widgets may communicate back-and-forth through the sandbox as if they were communicating directly.

The sandbox may process a large number of listening requests simultaneously. For example, the sandbox may have a plurality of outstanding listening requests and may check every inbound widget communication against that plurality of outstanding listening requests.

Figure 8:
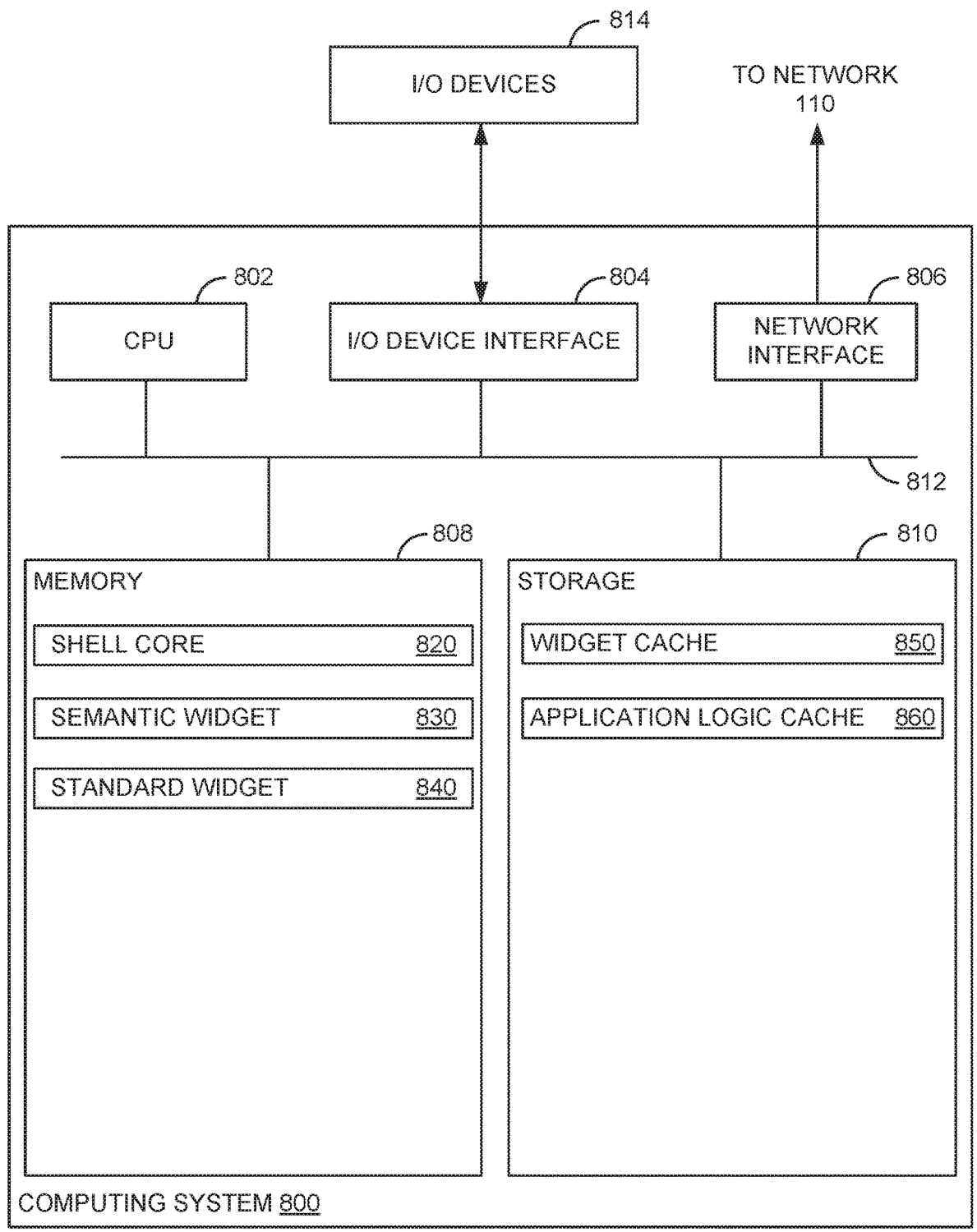
FIG. 8 illustrates an exemplary computing system configured to execute components of an application shell, according to one embodiment.

FIG. 8 illustrates a computing system 800 that executes a cross-platform application. As shown, the system 800 includes a central processing unit (CPU) 802, one or more I/O device interfaces 804 which may allow for the connection of various I/O devices 814 (e.g., keyboards, displays, mouse devices, pen input, etc.) to the system 800, network interface 808, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be a disk drive, solid state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes a shell core 820, a semantic widget 830 and a standard widget 840. Shell core 820 may manage elements of a cross-platform application including the lifecycles of widgets such as semantic widget 830 and standard widget 840. Semantic widget 830 and standard widget 840 are segments of a cross-platform application used to represent and perform discrete tasks. Semantic widget 830 may be a widget used across a plurality of platforms. Standard widget 840 may be a widget for use on a particular platform.

As shown, storage 810 includes a widget cache 850 and an application logic cache 860. Widget cache 850 may be a local store of widgets to be used in a cross-platform application. The widgets stored in widget cache 850 are received from a remote widget repository over network 110. Application logic cache 860 may be a local store of application logic that provides functional code for a cross-platform application. Application logic cache 860 receives functional code from a remote application logic repository, over network 110.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A system for facilitating communication between widgets of cross-platform applications, comprising:
   a processor, and
   a memory storing an application shell that includes an execution container and sandbox which when the application shell is executed by the processor performs a method comprising:
     creating a standard widget to obtain user input that executes on a first layer outside of the execution container in a single platform;
     receiving a semantic widget that executes on a second layer within the execution container, wherein the first layer and the second layer are different layers;
     managing communication between the standard widget executing outside of the execution container and the semantic widget executing within the execution container,
     wherein the standard widget and the semantic widget operate on different layers and are incapable of direct communication, and
     wherein the management of communication between the standard widget and the semantic widget includes:
       receiving via the sandbox a subscription request from the semantic widget for the user input from the standard widget that corresponds to a topic;
       obtaining the user input via the standard widget that:
         receives the user input,
         generates a report including the user input, and
         transmits the report to the sandbox;
       determining via the sandbox the user input in the report matches the topic of the subscription request based on the report including:
         the topic in the header of the report, or
         a keyword related to the topic in the report; and transmitting, based on the subscription request, via the sandbox the user input corresponding to the topic to the semantic widget.

2. The system of claim 1, wherein the method further comprises terminating the subscription request from the semantic widget after a period of time associated with the subscription request is completed.

3. The system of claim 1, wherein the user input received by the standard widget is generated based on an interaction with a user of the cross-platform application.

4. The system of claim 1, wherein the semantic widget operates using a semantic user interface and the standard widget operates using a standard user interface, wherein the semantic user interface allows the semantic widget to accurately represent a physical form and the standard user interface allows the standard widget to display user interface elements selected for a device the cross-platform application executes on.

5. The system of claim 1, wherein the method further comprises terminating the standard widget following transmission of the user input.

6. The system of claim 1, wherein the method further comprises: receiving the application shell from an application server.

7. The system of claim 1, wherein the method further comprises:
   determining the semantic widget or the standard widget is out-of-date; and
   receiving an updated version of the semantic widget or the standard widget.

8. A method for facilitating communication between widgets of a cross-platform application by an application shell that includes an execution container and sandbox, comprising:
   creating a standard widget to obtain user input that executes on a first layer outside of the execution container in a single platform;
   receiving a semantic widget that executes on a second layer within the execution container, wherein the first layer and the second layer are different layers;
   managing communication between the standard widget executing outside of the execution container and
   the semantic widget executing within the execution container,
   wherein the standard widget and the semantic widget operate on different layers and are incapable of direct communication, and
   wherein the management of communication between the standard widget and the semantic widget includes:
     receiving via the sandbox a subscription request from the semantic widget for the user input from the standard widget that corresponds to a topic;
     obtaining the user input via the standard widget that:
       receives the user input,
       generates a report including the user input, and
       transmits the report to the sandbox;
     determining via the sandbox the user input in the report matches the topic of the subscription request based on the report including:
       the topic in the header of the report, or
       a keyword related to the topic in the report; and
     transmitting, based on the subscription request, via the sandbox the user input corresponding to the topic to the semantic widget.

9. The method of claim 8, further comprising: terminating the subscription request from the semantic application widget after a period of time associated with the subscription request is completed.

10. The method of claim 8, wherein the user input received by the standard widget is generated based on an interaction with a user of the cross-platform application.

11. The method of claim 8, wherein the semantic widget operates using a semantic user interface and the standard widget operates using a standard user interface, the semantic user interface allows the semantic widget to accurately represent a physical form and the standard user interface allows the standard widget to display user interface elements selected for a device the cross-platform application executes on.

12. The method of claim 8, further comprising terminating the standard widget following transmission of the user input.

13. The method of claim 8, wherein the method further comprises: receiving the application shell from an application server.

14. The method of claim 8, wherein the method further comprises:
    determining the semantic widget or the standard widget is out-of-date; and
    receiving an updated version of the semantic widget or the standard widget.

15. A non-transitory computer readable medium comprising instructions to be executed in a computer system, wherein the instructions when executed in the computer system perform a method for facilitating communication between widgets of cross-device application by an application shell that includes an execution container and a sandbox, comprising:
    creating a standard widget to obtain user input that executes on a first layer outside of the execution container in a single platform;
    receiving a semantic widget that executes on a second layer within the execution container, wherein the first layer and the second layer are different layers;
    managing communication between the standard widget executing outside of the execution container and
    the semantic widget executing within the execution container,
    wherein the standard widget and the semantic widget operate on different layers and are incapable of direct communication, and
    wherein the management of communication between the standard widget and the semantic widget includes:
      receiving via the sandbox a subscription request from the semantic widget for the user input from the standard widget that corresponds to a topic;
      obtaining the user input via the standard widget that:
        receives the user input,
        generates a report including the user input, and
        transmits the report to the sandbox;
      determining via the sandbox the user input in the report matches the topic of the subscription request based on the report including:
        the topic in the header of the report, or
        a keyword related to the topic in the report; and
      transmitting, based on the subscription request, via the sandbox the user input corresponding to the topic to the semantic widget.

16. The non-transitory computer readable medium of claim 15, the method further comprising: terminating the subscription request from the semantic application widget after a period of time associated with the subscription request is completed.

17. The non-transitory computer readable medium of claim 15, wherein the semantic widget operates using a semantic user interface and the standard widget operates using a standard user interface, the semantic user interface allows the semantic widget to accurately represent a physical form and the standard user interface allows the standard widget to display user interface elements selected for a device the cross-device application executes on.

18. The non-transitory computer readable medium of claim 15, wherein the user input received by the standard widget is generated based on an interaction with by a user of the cross-platform application.

19. The non-transitory computer readable medium of claim 15, the method further comprising terminating the standard widget following transmission of the user input.

20. The non-transitory computer readable medium of claim 15, wherein the method further comprises: receiving the application shell from an application server.

\* \* \* \* \*